United States Patent [19]
Nix et al.

[11] Patent Number: 5,638,440
[45] Date of Patent: Jun. 10, 1997

[54] PROTECTION CIRCUIT FOR TELEPHONE SYSTEMS

[75] Inventors: Michael A. Nix, Buda; Walter S. Schopfer; Sergio R. Ramirez, both of Austin, all of Tex.

[73] Assignee: Advanced Micro Devices, Inc., Sunnyvale, Calif.

[21] Appl. No.: 487,999

[22] Filed: Jun. 7, 1995

[51] Int. Cl.⁶ .............................. H04M 3/06; H04M 1/24
[52] U.S. Cl. ........................ 379/412; 379/413; 379/418; 379/398; 379/27; 379/30
[58] Field of Search .................... 379/412, 399, 379/414, 322, 323, 324, 29, 30, 32, 418; 323/203, 235, 319

[56] References Cited

U.S. PATENT DOCUMENTS

| | | | |
|---|---|---|---|
| 3,996,426 | 12/1976 | Lancaster | 379/412 |
| 4,079,210 | 3/1978 | Sanderson | 379/382 |
| 4,995,111 | 2/1991 | Tojo et al. | 379/382 |
| 5,038,375 | 8/1991 | Sinberg | 379/398 |
| 5,323,461 | 6/1994 | Rosenbaum et al. | 379/399 |
| 5,402,482 | 3/1995 | Minohara et al. | 379/377 |
| 5,406,623 | 4/1995 | Rovik | 379/418 |
| 5,426,695 | 6/1995 | Misu | 379/252 |
| 5,440,612 | 8/1995 | Siligoni et al. | 379/27 |

Primary Examiner—Krista M. Zele
Assistant Examiner—Jacques M. Saint-Surin
Attorney, Agent, or Firm—Foley & Lardner

[57] ABSTRACT

A power-cross detection circuit includes a zero crossing detection circuit for detecting a first zero crossing of the current from a first positive half-cycle to a first negative half-cycle, a second zero crossing of the current from a second positive half-cycle to a second negative half-cycle, and a third zero crossing of the current from a third positive half-cycle to a third negative half-cycle and a circuit for detecting a voltage level and outputting a first signal when the voltage level exceeds a predetermined voltage level, between the first zero crossing and the second zero crossing and between the second zero crossing and the third zero crossing. The zero crossing detection circuit outputs a second signal based on the first, second and third zero crossings. The power-cross detection circuit also includes a logic circuit for outputting a third signal when the time interval between the first zero crossing and the second zero crossing and between the second zero crossing and the third zero crossing is between 14 milliseconds and 24 milliseconds. A power-cross condition is detected based on the first, second and third signals.

26 Claims, 13 Drawing Sheets

FIG. 6B

| SIGNAL NAME | LOGIC SIGNAL DESCRIPTION |
|---|---|
| RNGRO | RINGING RELAY CLOSED |
| VPC | HIGH WHEN VRGFD1 > 50V |
| IZXRISE_L | LOW FOR 125 USEC AFTER A RISING CURRENT ZERO CROSSING |
| IZXFALL_L | LOW FOR 125 USEC AFTER A FALLING CURRENT ZERO CROSSING |
| Q(8:0) | 9 BIT, 50 ms TIMER OUTPUTS (RESET TO ZERO BY IZXFALL_L) |
| PH2_8K | 8 KHz, 125 ns PULSE |
| PH2 | 8 MHz CLOCK |
| d1q, d2q | OUTPUTS OF SHIFT REGISTER, d1d2, FORMED BY FLIP-FLOPS d1 AND d2 |
| d3ql, d4ql | OUTPUTS OF SHIFT REGISTER, d3d4, FORMED BY FLIP-FLOPS d3 AND d4 |
| d5ql, d6ql | OUTPUTS OF SHIFT REGISTER, d5d6, FORMED BY FLIP-FLOPS d5 AND d6 |
| PWRCRSL | LATCHES LOW WHEN A POWER CROSS IS RECOGNIZED |
| inter_h | HIGH WHEN TIMER Q(8:0) IS BETWEEN 14 AND 24 ms |

PROTECTION CIRCUIT FOR TELEPHONE SYSTEMS

BACKGROUND OF THE INVENTION

A. Field of the Invention

The present invention relates to a circuit for detecting a foreign potential on telephone lines and, more particularly, to a power-cross detection circuit used for protecting telephone systems.

B. Background of Related Art

Any terminal device connected to a telephone line must undergo a "power-cross" test. This test is performed in order to verify the ability of the terminal to detect the presence of a foreign potential such as a high voltage of up to 1000 volts a-c from the local power company which may become crossed with the telephone line in the environment outside a telephone plant. FIG. 1 shows a telephone 10 connected to a telephone plant 12 through wires 14. A power line 16 poses a threat to a telephone plant 12 and any personnel operating the equipment. The test includes forcing a 1 ampere current into tip and ring terminals 18, 20 regardless of the state (i.e. talking, standby or ringing) of the line and checking whether the plant 12 survives the test. Generally, to provide a 1 ampere current, a 1,000 volt, 60 hertz signal through a 1 k ohm resister is applied to the tip and ring terminals 18, 20. Other combinations of voltages and resistance values, such as a 600 volts signal through a 600 ohms resistor, or a 50 volts signal through a 50 ohms resistor could also be used.

As mentioned above, the power-cross test is applied regardless of the state of the plant 12 i.e., a person could be talking on the telephone, the telephone could be in a standby mode, or the telephone could be ringing. In known techniques, during either the talking mode or the standby mode, as shown in FIGS. 1 and 2, a protection device such as a diode, SCR, or a neon lamp 22 is connected to terminals 18 and 20 so that when a high voltage such as the 118 volts a-c power signal crosses wires 14 (FIG. 1), the current goes through the protection device 22, thereby preventing the telephone plant 12 or telephone 10 from being damaged.

As shown in FIG. 3, during the ringing mode, the telephone 10 is connected to ground via the tip terminal 18, whereas the ring terminal 20 is connected to a ringer voltage RV for performing the ringing operation of telephone 10. In this situation, the protection device 22 is disconnected. Thus, although there is some kind of protection provided in the talking and standby modes, there is no protection provided if the power-cross test is conducted in the ringing mode.

SUMMARY OF THE INVENTION

The present invention provides a circuit and technique which detects the presence of power-cross high voltage signal during the ringing mode of the telephone and protects the telephone system and the telephone plant by interrupting the ringing operation of the telephone.

Accordingly, the present invention relates to an apparatus and method for detecting the power-cross condition, which include the operative steps of: a) detecting the voltage level of an input signal; b) detecting a first zero crossing of the current of the input signal from a first positive half-cycle to a first negative half-cycle; c) detecting a second zero crossing of the current from a second positive half-cycle to a second negative half-cycle; d) detecting a third zero crossing of the current from a third positive half-cycle to a third negative half-cycle; e) outputting a first signal when the voltage level exceeds a predetermined voltage level, anytime between the first zero crossing and the second zero crossing, and anytime between the second zero crossing and the third zero crossing; f) outputting a second signal upon detection of the first, second and third zero crossings; g) outputting a third signal when the time interval between the first zero crossing and the second zero crossing, and also between the second zero crossing and the third zero crossing is between 14 milliseconds and 24 milliseconds; and h) outputting a power-cross detected signal based on the first, second, and third signals.

For the better understanding of the present invention, reference is made to the following description and accompanying drawings while the scope of the invention will be pointed out in the appended claims.

BRIEF DESCRIPTION OF THE DRAWINGS

In the drawings:

FIG. 6B shows the logical signal description of the power-cross detection circuit shown in FIG. 6A;

DETAILED DESCRIPTION OF THE PREFERRED EMBODIMENTS

Figure 1:
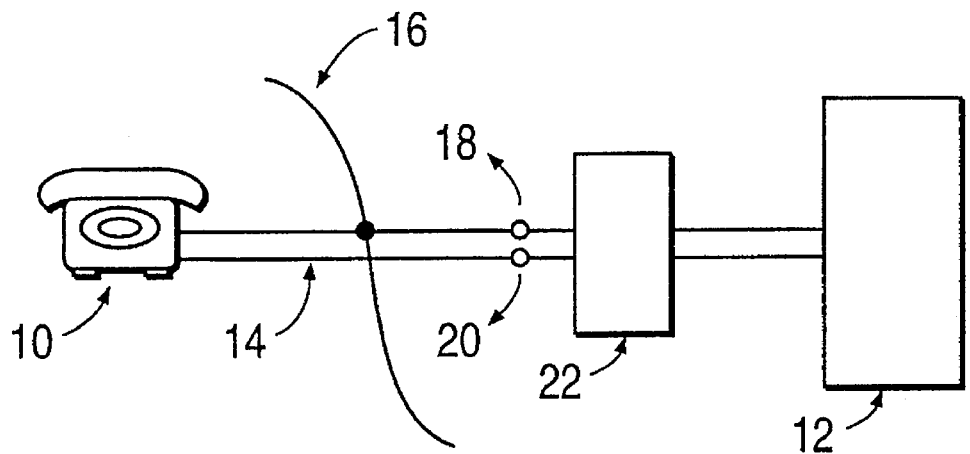
FIG. 1 is a schematic circuit diagram of a typical power-cross test detection circuit.
Figure 2:
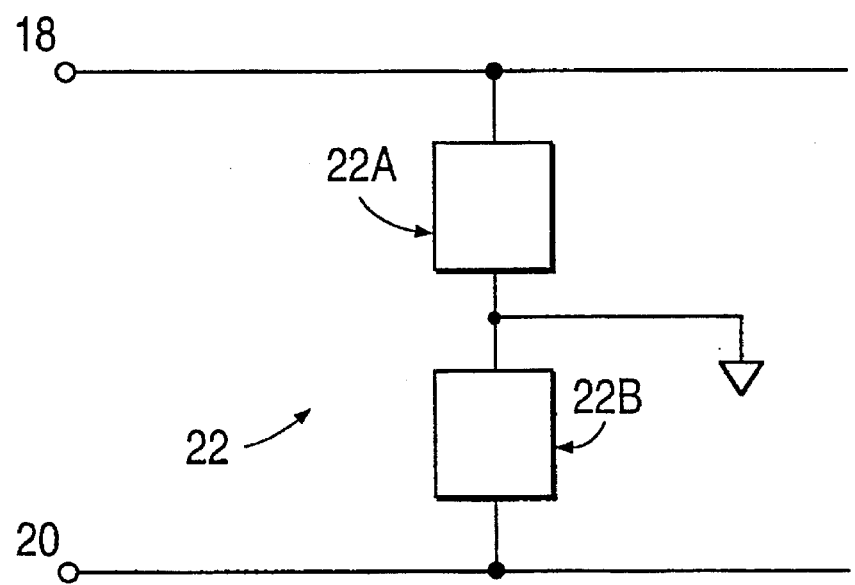
FIG. 2 illustrates the protection device configuration according to the circuit shown in FIG. 1.
Figure 3:
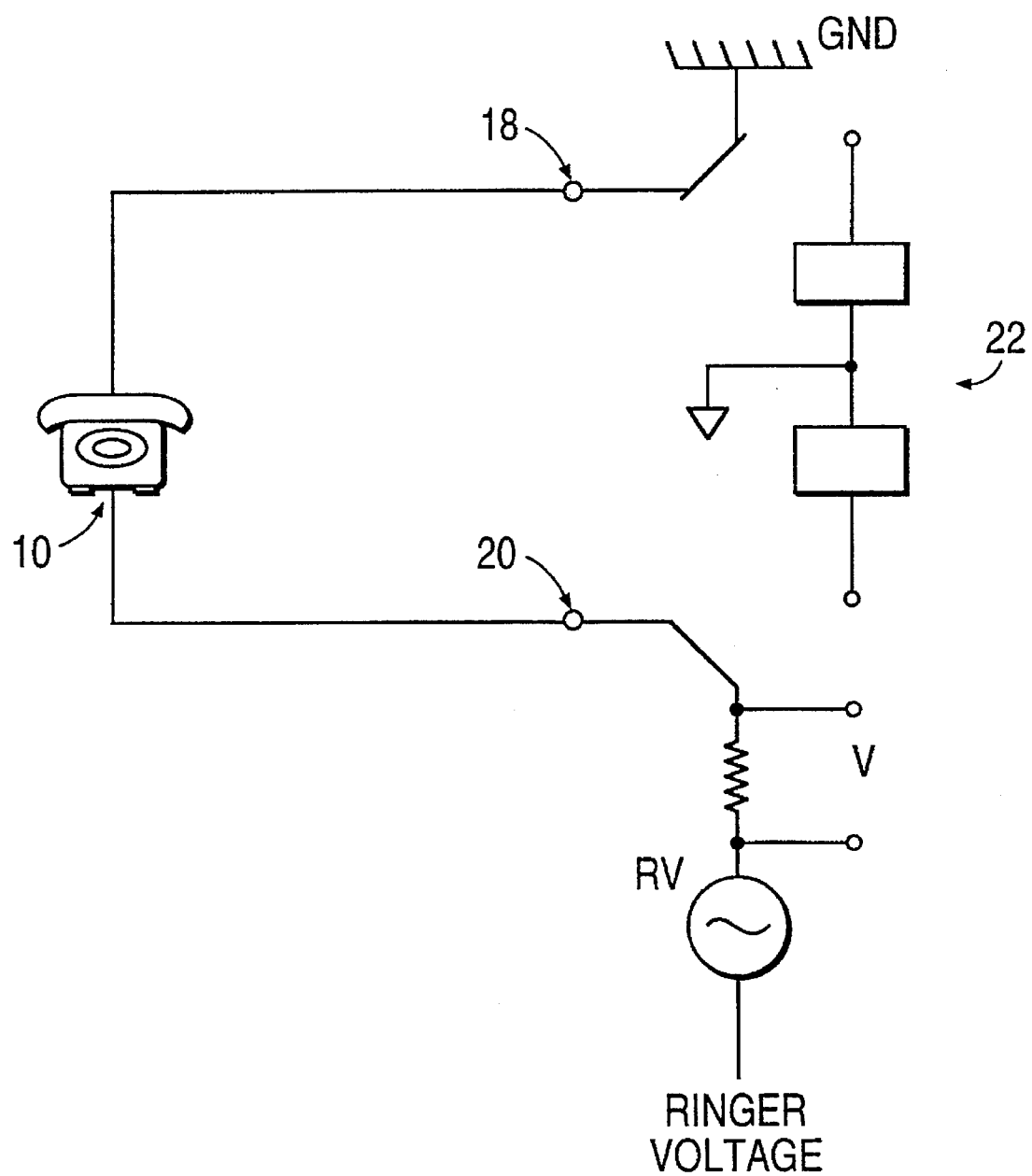
FIG. 3 shows a schematic circuit diagram illustrating the ringing state of the circuit shown in FIG. 1.
Figure 4A:
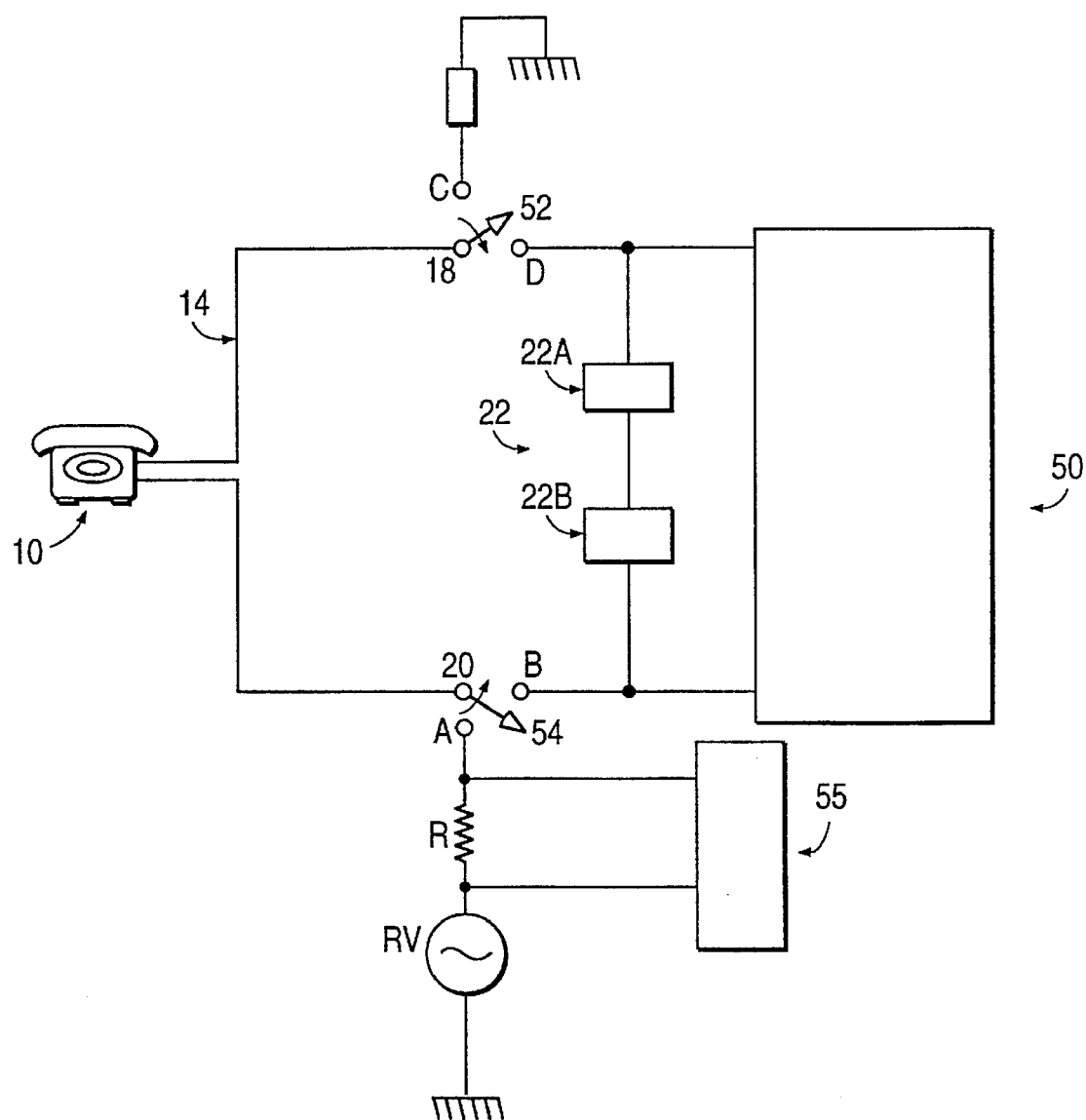
FIG. 4A shows a schematic circuit diagram of a telephone connected to a power-cross detection circuit, according to the teachings of the present invention.

Referring now to the drawings, and more particularly to FIG. 4A, there is shown a telephone 10 connected to a SLIC (subscriber line interface circuit) 50 with a telephone line 14 through tip and ring terminals 18, 20. Two protection devices 22A and 22B are connected from the terminals 52 and 54 to ground. Relays 52 and 54 are connected between terminals 18, 20 and the protection devices 22A and 22B. A ring feed resistor R and a Ringer Voltage (RV) are connected to relay 54 and terminal 20. A ring trip and power-cross detection (PCD) circuit 55 is connected across resistor R.

In the talking and standby modes of the telephone, the relays 52 and 54 are positioned such that the tip terminal 18 is connected to node D and the ring terminal 22 is connected to node B. In the ringing mode, the tip terminal 18 is connected to node C and the ring terminal 20 is connected to node A.

Figure 5:
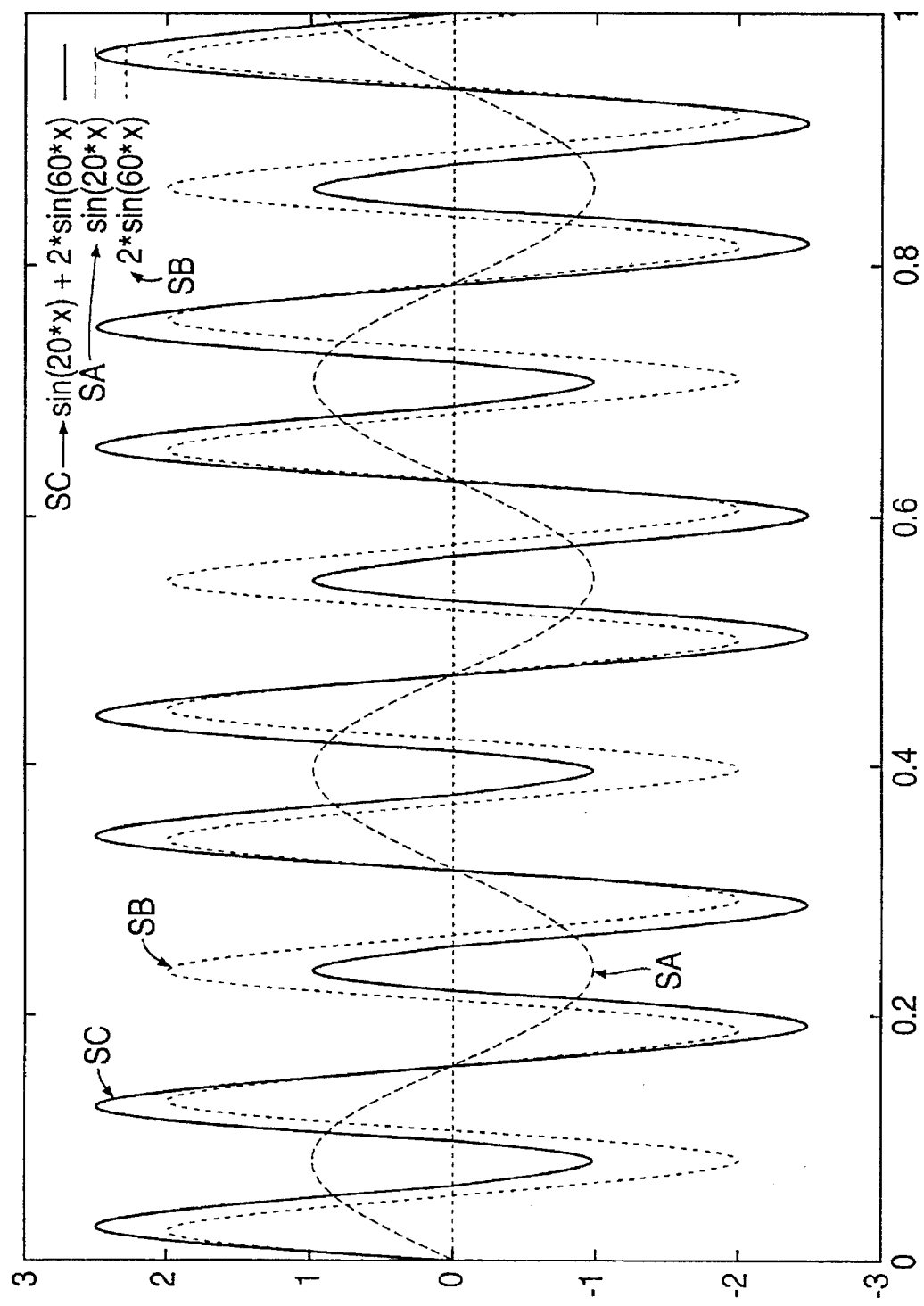
FIG. 5 shows typical voltage waveforms with respect to time at various points in the circuit illustrated in FIG. 4A.

Referring now to FIG. 5, waveform 5A shows the waveform produced by ringer voltage RV which is a 20 Hz frequency voltage, waveform 5B shows a high voltage 60 Hz frequency signal waveform which is applied during the power-cross test, and waveform 5C shows a waveform obtained by superimposing the waveforms 5A and 5B. Whenever two waveforms with different frequencies are combined, the waveform with the higher magnitude dominates, and thus in this case, the period of the superimposed waveform is similar to the period of the 60 Hz frequency signal. Equation 1 describes the waveform shown in FIG. 5.

$$f(t) = A_{ring} \operatorname{Sin} 2\pi \cdot 20t + A_{test/short} \operatorname{Sin} 2\pi \cdot 60t \quad (1)$$

wherein $A_{ring}$ is the amplitude of the ringer waveform (5A), $A_{test/short}$ is the amplitude of the 60 Hz waveform (5B) and t is the time.

According to the instant invention, the signature of the superimposed waveform 5C is analyzed.

Figure 4B:
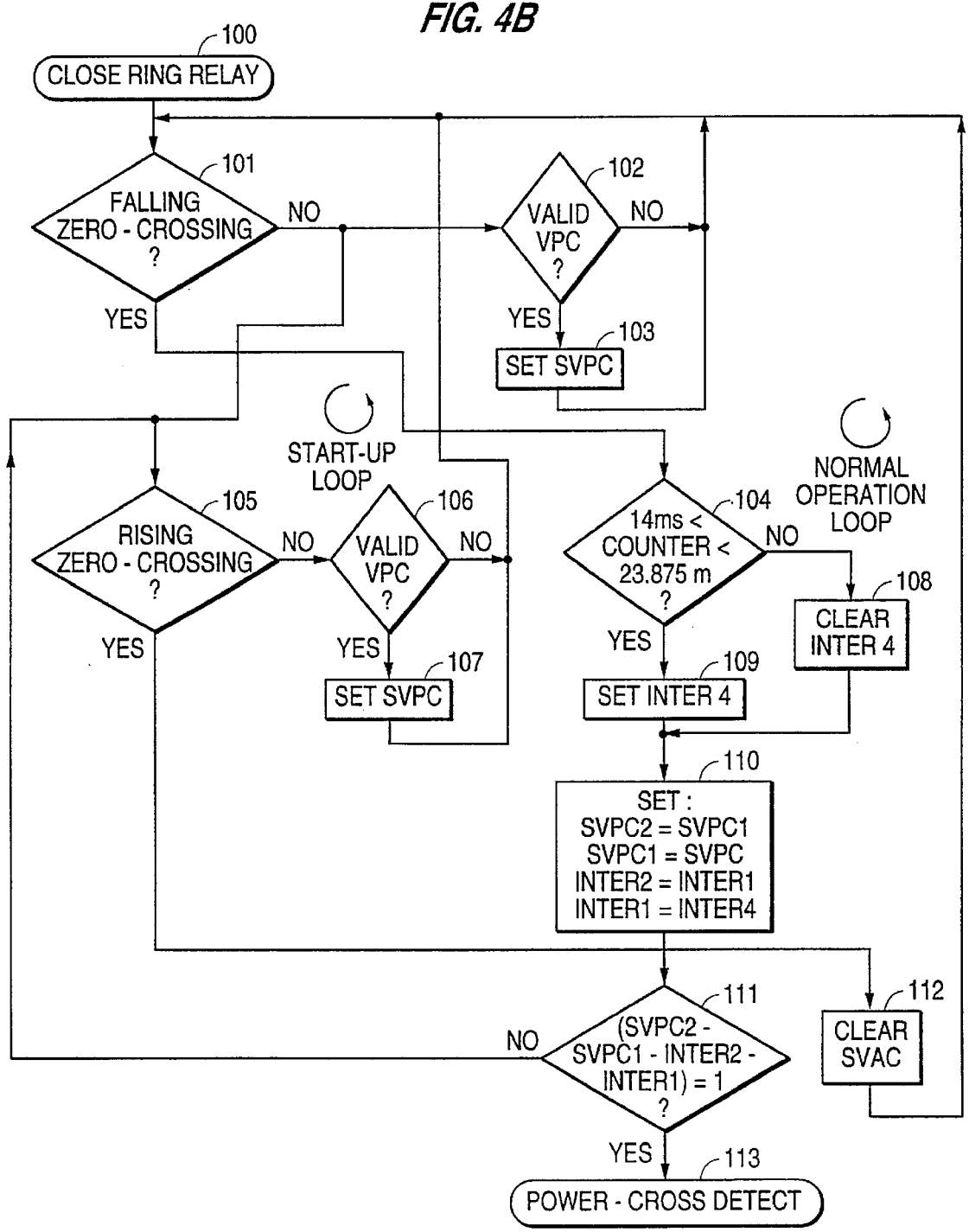
FIG. 4B shows a flow chart of the power-cross detection technique according to a first embodiment of the instant invention.

FIG. 4B is a flowchart showing the function of the PCD circuit 55 (FIG. 4A) in the ringing mode, according to a first embodiment of the invention. As will be explained in more detail later, the loop current is measured to determine the zero crossings of a signal waveform.

Briefly, the PCD circuit 55 first detects the voltage level of an input signal, next, detects a first zero crossing of the current from a first positive half-cycle to a first negative half-cycle, thereafter, detects a second zero crossing of the current from a second positive half-cycle to a second negative half-cycle, then, and detects a third zero crossing of the current from a third positive half-cycle to a third negative half-cycle. The PCD circuit 55 monitors a first signal which is generated when the voltage level exceeds a predetermined voltage level anytime between the first zero crossing and the second zero crossing and anytime between the second zero crossing and the third zero crossing; a second signal which is generated upon detection of the first, second and third zero crossings; and a third signal which is generated when a time interval between the first zero crossing and the second zero crossing and between the second zero crossing and the third zero crossing is between 14 milliseconds and 24 milliseconds. Based on the first, second and third signals, the PCD circuit determines that a power-cross condition has occurred.

Figure 6A:
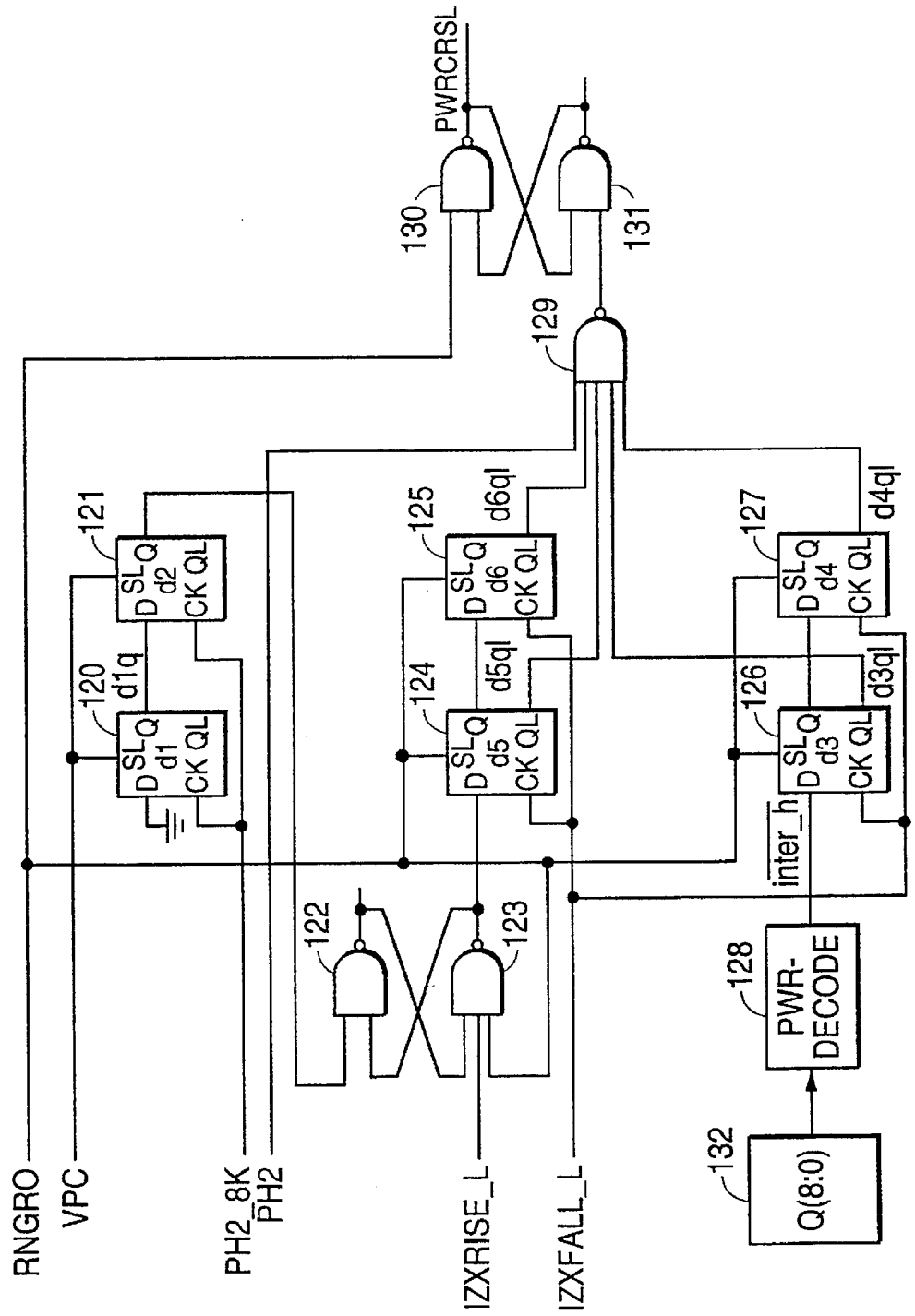
FIG. 6A shows a circuit diagram of the power-cross detection circuit according to the first embodiment of the instant invention.
Figure 7:
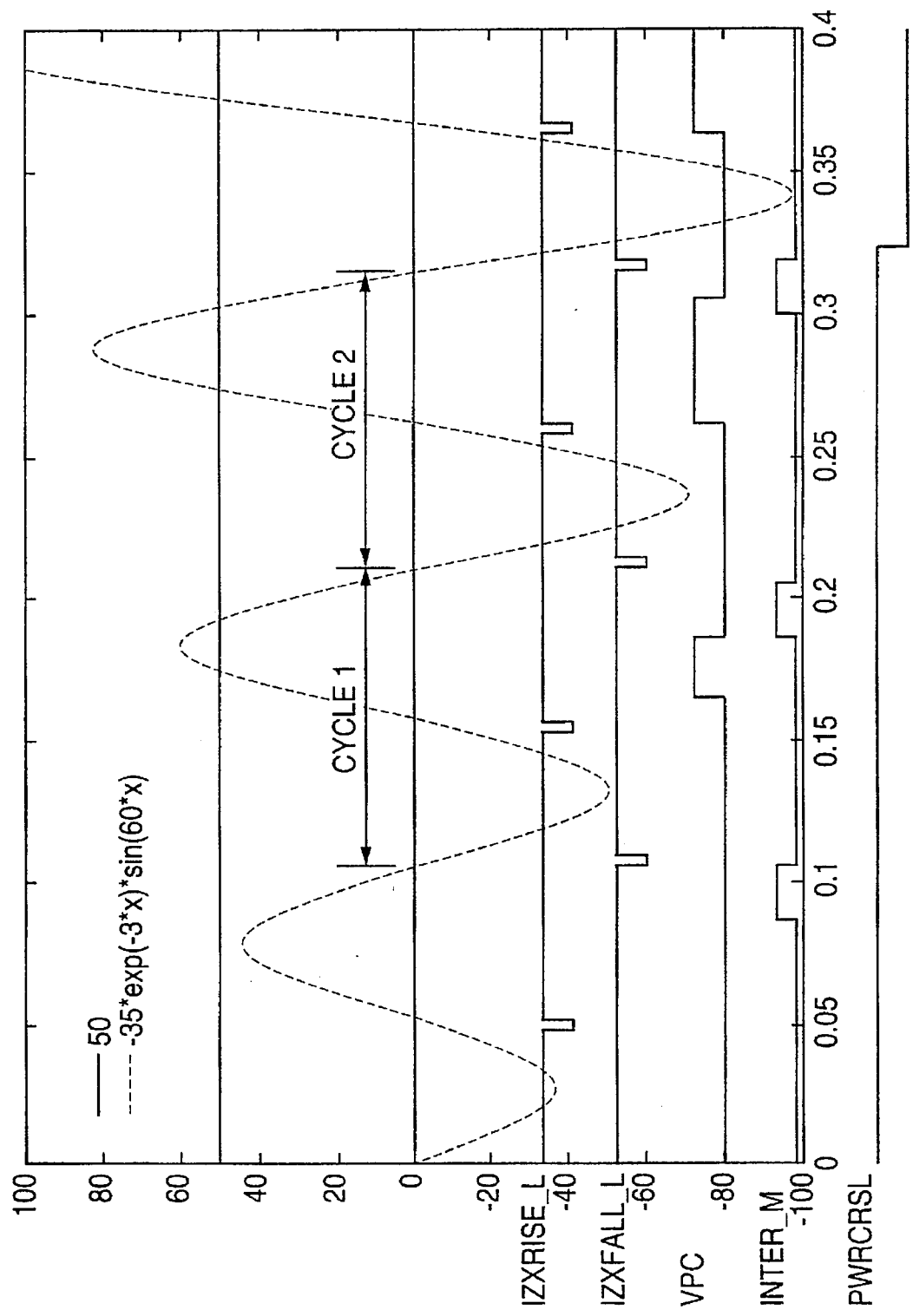
FIG. 7 is a detailed waveform diagram illustrating the waveforms shown in FIG. 5 and timing signals according to the power-cross detection circuit shown in FIG. 6A.

Referring to the flowchart in FIG. 4B and to FIGS. 6A, 6B, and 7, in step 100, when the ring-relay is closed, PCD circuit 55 measures the loop current passing through telephone set 10 by sensing the current through the ring feed resistor R. In step 101, falling zero crossings are detected. In step 105, if a rising zero crossing was not detected, then the PCD circuit 55 checks for a valid VPC (threshold voltage signal). In a preferred embodiment of the invention, the predetermined threshold value is about 50 Volts across a 510 ohm resistor. The threshold voltage can be equal to any value high enough to avoid induction voltage effects and avoid false on-hook ring trip detecting i.e. if VPC is also used for short loop ring trip.

When no falling zero crossings have occurred, but a valid VPC has been received (step 102), then in step 103, a latch 123 is set. When no falling or rising zero crossings have occurred, but a valid VPC has been received (step 106), then in step 107, the latch 123 (SVPC) is set. If in step 105, a rising zero-crossing is received then as shown in step 112, latch 123 is cleared. Returning to step 101, when a falling zero-crossing is received, then in step 104 the timing of the falling zero-crossing from a previous falling zero-crossing is measured to determine whether the time interval between two consecutive falling zero crossings is between a predetermined time interval. In the preferred embodiment of the invention the time interval is between 14 ms and 24 ms. In step 109, a latch 126 (INTER H) is set when the falling zero crossings occur within the time interval, otherwise latch 126 is cleared (step 108). Thereafter, in step 110, latches 124, 125, 126 and 127 are updated. In step 111, when logic circuit 129 is enabled, a power cross condition is detected (step 113).

Referring now to FIGS. 6A, 6B, and 7, the PCD circuit 55 includes latches 120, 121, 124, 125, 126, and 127, NAND gate 129, cross-coupled NAND gates 122, 123, 130, 131, counter 132, and decoder 128. A power-cross condition is detected by the PCD circuit 55 when all the four inputs to the NAND gate 129 have been enabled.

The signals input to the PCD circuit 55, i.e., RNGRO signal, VPC signal, and IZXRISE-L and IZXFALL-L signals are described, in U.S. application Ser. No. 08/483,868, (Attorney's Docket Number 19516/300) by Walter S. Schopfer and Sergio R. Ramirez, entitled "Integrated Ring Detection Circuit & Power Cross Detection Circuit with Persistence Timing", filed concurrently herewith, and in U.S. application Ser. No. 08/457,668, (Attorney's Docket Number 19516/150) by Michael Moyal and Walter S. Schopfer, entitled "Integrated Ring Sensor with Fault Detection", filed on Jun. 1, 1995, the disclosures of which are hereby incorporated by reference.

At start-up, when RNGRO signal is low, the ring-relay is open. RNGRO being low forces a PWRCRSL signal (output of NAND gate 130) inactive (high) and clears latches 124, 125, 126 and 127 and the two cross-coupled NAND-gates 122, 123. When the ring-relay closes, the RNGRO signal becomes high allowing latch 126 and latch 127 to sample the timing of the zero-crossing events, and allowing latches 124 and 125 to sample the high-voltage events.

In FIG. 6A, high-voltage events are indicated by the VPC signal. Whenever the voltage across the ring-feed resistor is greater than 50 volts, the VPC signal is high. To prevent very short-duration, high-voltage events across the ring-feed resistor from triggering a false power-cross, the VPC signal is debounced. Short-duration events that are filtered out by the VPC-debounce may include voltages induced by lightening or momentary loop closure. The debounce circuit includes latches 120 and 121. Signal D2Q is output from latch 121. Latches 120 and 121 are clocked by an eight kilohertz signal PH2-8K. Signal D2Q is the inverse of VPC if VPC is stable for longer than 125 microseconds (the period of PH2-8K).

Whenever the D2Q signal goes low, it is registered in the cross-coupled NAND-gates 122, 123 which generate the SVPC signal as an output. Each rising current-zero-crossing in the ring-feed resistor generates an IZXRISE-L pulse for clearing NAND gate 123. The SVPC signal is sampled at every falling current-zero-crossing by signal IZXFALL-L, and in this manner, each cycle of the current waveform in the ring-feed resistor is checked to see if there is a valid (greater than 125 microseconds in length, and in the top-half of the waveform) VPC event.

Latch 124 stores the VPC information for the previous cycle of current in the ring-feed resistor, and latch 125 stores the VPC information from two cycles previous. If the VPC-event was valid for the previous cycle, the output from latch 124, signal D5QL, becomes high. If the VPC-event from two cycles previous was valid, the output from latch 125, signal D6QL, becomes high.

In FIG. 6A, signal Q(8:0) is the output of a counter 132 which is reset to zero at each IZXFALL-L pulse. Signal Q(8:0) is incremented by one every 125 microseconds. PWRDECODE 128 decodes the output of counter 132. If counter 132 is between 112 and 191 (inclusive), signal INTER-H (output from decoder 128) becomes low. INTER-H is sampled by IZXFALL-L and stored in latch 126. The output from latch 126, signal D3QL, indicates whether or not the previous cycle of current in the ring-feed resistor had a period of between 14 and 23.875 milliseconds. This period corresponds to frequencies between about 41.88 to 71.43 Hertz. Normal ring frequencies of 16 to 30 Hertz fall outside of the detection region. Power-cross frequencies of 50 and 60 Hertz fall within the detection region. Signal D3QL is high if the previous cycle of the current in the ring-feed resistor had a period of 14 to 23.875 milliseconds. Signal D4QL, the output from latch 127, becomes high if the period of the current during two cycles previous was between 14 and 23.875 milliseconds.

Specifically, when the first falling current zero crossing occurs, counter 132 is reset to 0 ms. After the INTER H signal becomes high at 14 ms, a logic 1 is clocked into latch 126 at the next IZXFALL-L pulse. If another IZXFALL-L pulse occurs before INTER H becomes low again at 24 ms, both D3Q1 and D4Q1 become high.

A power-cross is detected based on the previous two cycles of the current in the ring-feed resistor. These cycles are marked by the pulses on the IZXFALL-L waveform. A valid power-cross is detected whenever, the two previous cycles have a period of 14 to 23.875 milliseconds (D3QL and D4QL high) and the two previous cycles have a valid VPC event in the top-half of the cycles (D5QL and D6QL high). If all the conditions are met, D3QL, D4QL, D5QL and D6QL are set high, and PH2 is high, then the output of the NAND gate 129 becomes low, which sets the PWRCRSL cross-coupled-NAND-gates 130, 131. Signal PH2 is an input to the NAND gate 129 to prevent decode glitches on the output of gate 129 from setting the PWRCRSL latch when D3QL, D4QL, D5QL, and D6QL are making transitions on the rising edge of IZXFALL-L. PH2 goes low before IZXFALL-L undergoes a zero-to-one transition. Once power-cross is detected, PWRCRSL stays active until the ring-relay is opened and RNGRO goes low. When the PCD circuit 55 detects the presence of power-cross while the telephone 10 is ringing, as discussed above with reference to FIG. 4B, it switches relays 52 and 54 to disconnect node A from terminal 20 and node C from terminal 18, and connects terminals 18 and 20 to the protection device 22.

Figure 8:
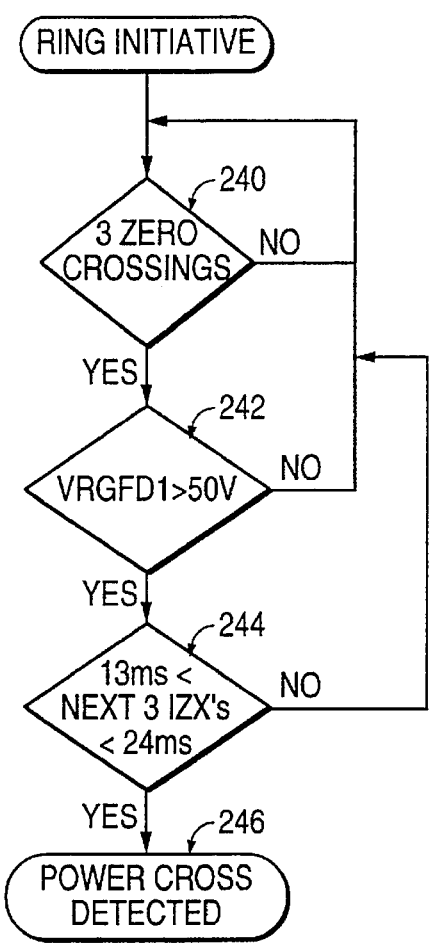
FIG. 8 shows a flow chart of the power-cross detection technique according to a second embodiment of the instant invention.

FIG. 8 is a flowchart showing the function of the PCD circuit 55 (FIG. 4A) in the ringing mode, according to a second embodiment of the invention. In step 40, PCD circuit 55 measures the loop current passing through telephone set 10 by sensing the current through the ring feed resistor R. In this embodiment, when a total of three zero crossings have occurred then in step 42, a voltage proportional to the ringer voltage RV is sensed and compared to a predetermined threshold voltage. If the measured voltage is greater than the threshold voltage, then in step 44, PCD circuit 55 determines whether the zero crossings of the signal waveform have occurred during a predetermined time interval. If the three zero crossings have occurred in the above time interval, the PCD circuit 55 determines that a power-cross condition has occurred.

Referring again to FIGS. 5 and 8, as shown in step 40, the PCD circuit 55 first detects a falling edge zero crossing X, i.e zero crossing of the current from a positive half-cycle to a negative half-cycle; next, the PCD circuit 55 detects a rising edge zero crossing Y, i.e. zero crossing of the current from a negative half-cycle to a positive half-cycle; and finally the PCD circuit 55 detects a falling edge zero crossing Z, i.e zero crossing of the current from a positive half-cycle to a negative half-cycle. A block diagram of the PCD circuit 55 is shown in FIG. 9 and will be discussed later.

Also, as shown in step 42, the voltage level of the waveform is compared to a threshold voltage TV. The value of the threshold voltage has to be high enough so as to ignore any induction voltage in the wires 14. To detect the high voltage, a comparator circuit (not shown) is used. More particularly, the voltage level is compared to the threshold voltage in the comparator circuit.

As shown in step 44, and discussed in more detail later, the PCD circuit 55 also determines the timings of the zero crossings, i.e., whether the zero crossings X, Y and Z have occurred during a time period of between 14 to 24 milliseconds.

Figure 9:
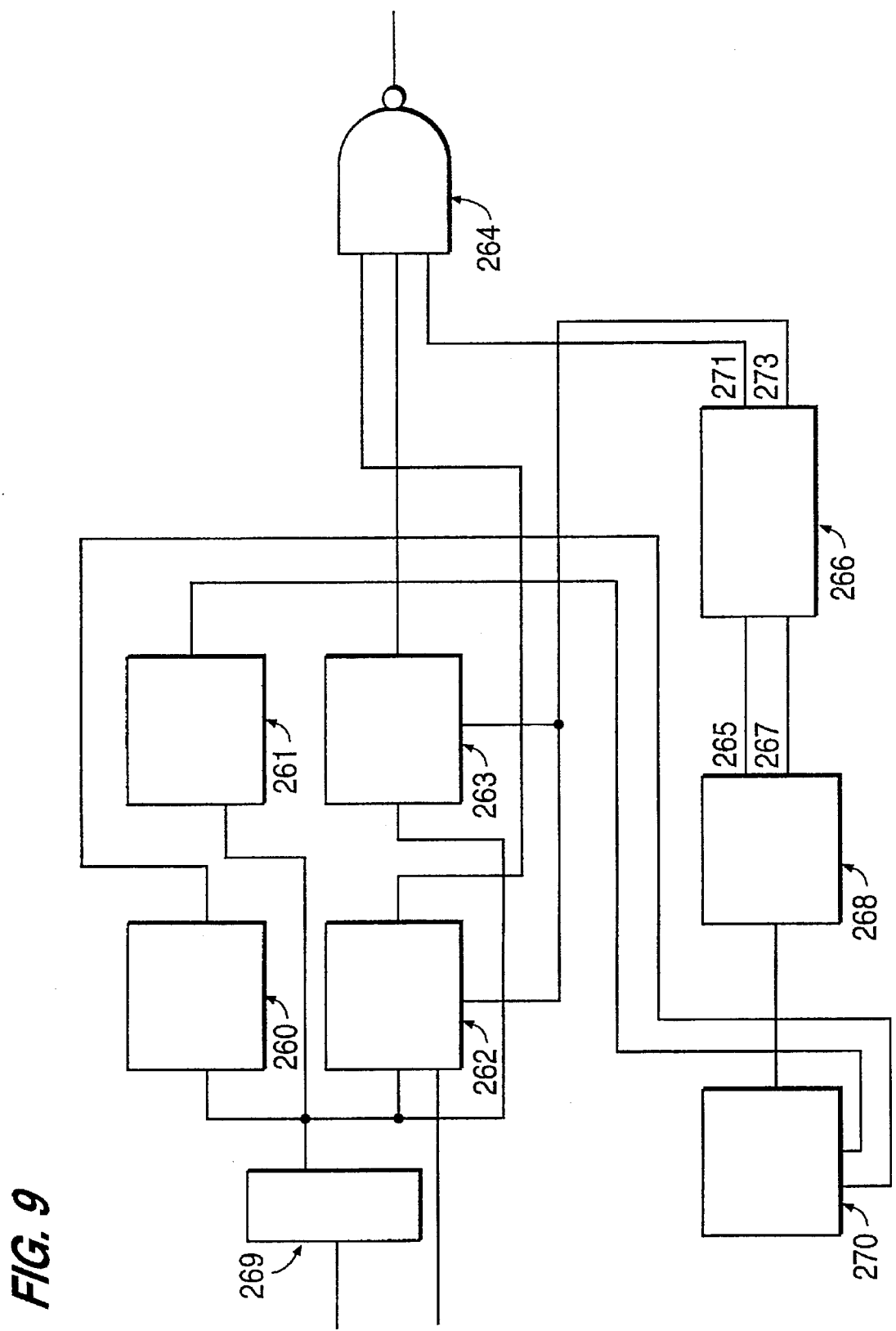
FIG. 9 shows a block diagram of the power-cross detection circuit according to the second embodiment of the instant invention.
Figure 10:
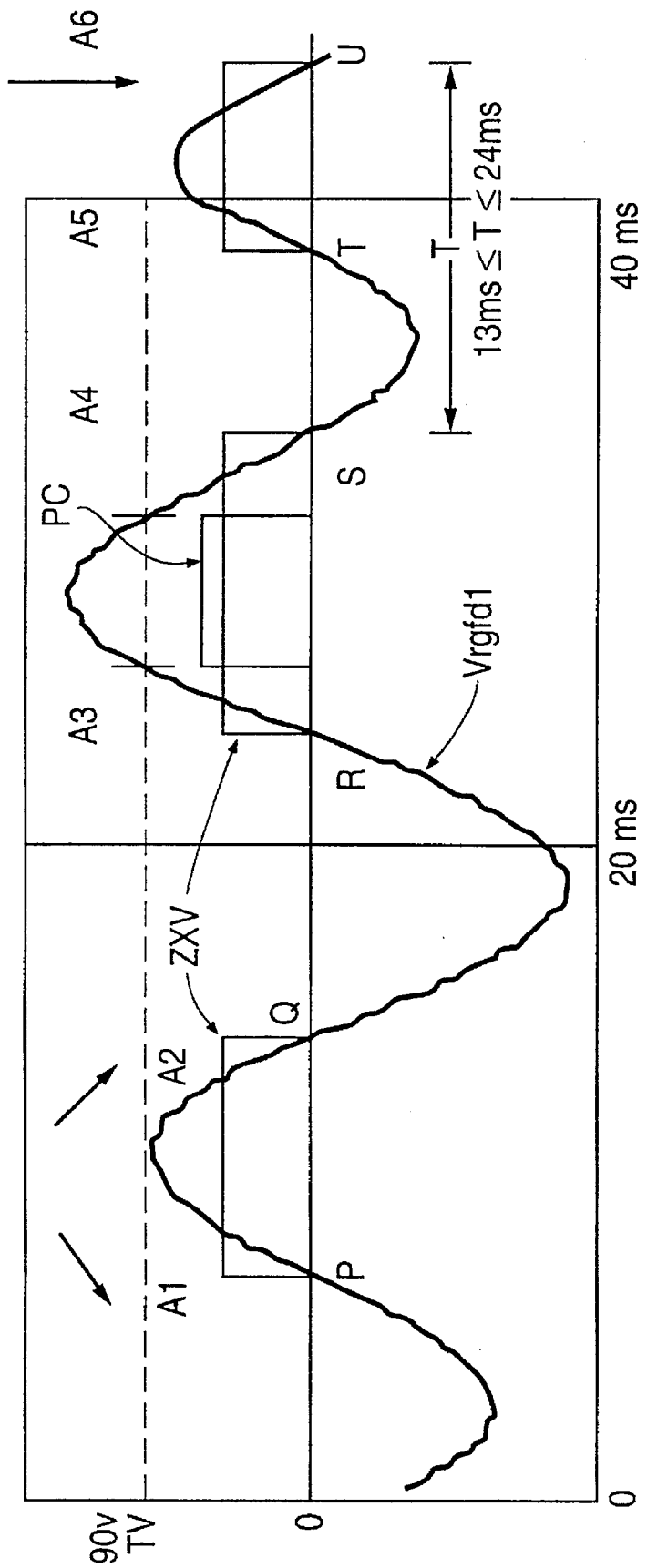
FIG. 10 is a detailed waveform diagram illustrating the waveforms shown in FIG. 5, according to the second embodiment of the instant invention.

Referring now to FIGS. 9 and 10 (FIG. 10 shows the superimposed waveform 5C in more detail), the PCD circuit 55 includes latches 260, 261, 262, and 263, a NAND gate 264, a timing detector 266, a decoder circuit 268, a zero crossing detector 269 and a counter 270. The zero crossing detector 269 may be formed by using a comparator. The latches 260 and 261 delay the activation of the timing detector 266. This insures that the power-cross detection by PCD circuit 55 is due to a power-crossing and not due to glitches (bouncing) which occur when relays 52 and 54 (FIG. 4A) are opened and closed. Referring to FIG. 10, latch 260 monitors the low to high transition (event A1) of the zero crossing (node P) and latch 261 monitors a high to low transition (event A2) of the zero crossing (node Q). Thus, latches 260 and 261 are used as a safeguard against the glitches in the instant invention.

Referring to FIG. 9, a power-cross condition is detected by the PCD circuit 55 when all the three inputs to the NAND gate 264 have been enabled.

Assume that events A1 and A2 have already occurred, and in the ringing mode, the timing detector 266 has been enabled (powered). First, a high voltage is detected. The high voltage input VPC, which is output from a comparator (not shown), after being compared to a threshold voltage value, sets latch 262 (event A3) and enables the first input of the NAND gate 264.

Next, a high to low transition (event A4) of the zero crossing (node S) is detected by the zero crossing detector 269. Event A4 is not stored in a latch, however, event A4 resets counter 270. Thus, when counter 270 becomes zero, it is determined that a high to low transition (event A4) has occurred. Thereafter, counter 270 is enabled and it starts counting. The output of counter 270 is decoded by the decoder 268. The purpose of counter 270 is to keep track of the timing of the zero crossings.

Next, a low to high transition (event A5) of the zero crossing (node T) is detected by the zero crossing detector 269. Event A5 is stored in latch 263 and thus the second input to the NAND gate 264 is enabled.

The third input of the NAND gate 264 is connected to the output of the timing detector 266. The timing detector 266, the decoder 268 and the counter 270 monitor the zero crossing timing of the superimposed waveform. When a next zero crossing occurs, the counter 270 is reset. In operation, the counter 270 starts counting with a high to low zero crossing (event A4). A low to high zero crossing is stored (event A5) and when the next high to low transition (event A6) zero crossing (node U) occurs, counter 270 is reset. The timing detector 266 monitors the two signals outputted from the decoder 268, i.e., the zero signal 265 and the interval signal 267 to determine whether the counter 270 was set and reset at the proper moment. The zero signal 265 is active high when the contents of counter 270 are equal to "0" and the interval signal 267 is active high when the contents of counter 270 are between "112" (14 milliseconds) and "192" (24 milliseconds).

Figure 11:
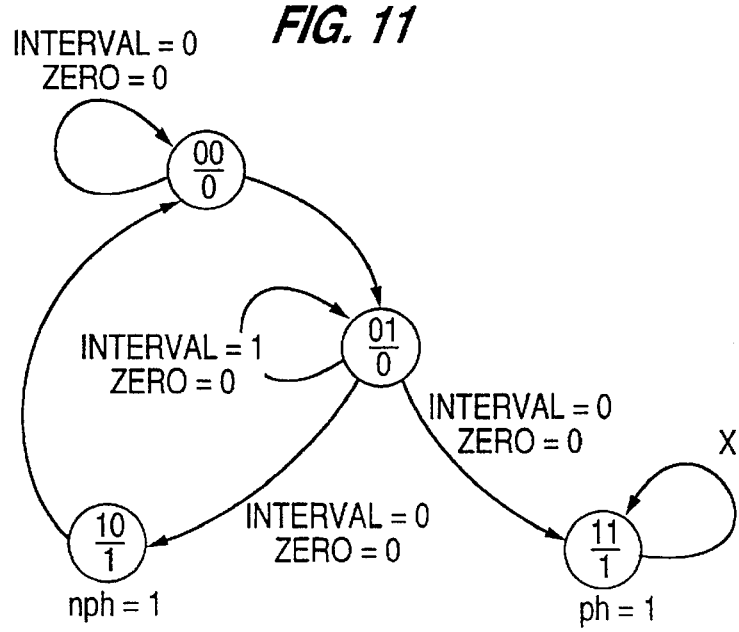
FIG. 11 is a state diagram illustrating the implementation of the timing detector in the power detection circuit according to the second embodiment of the instant invention.

In the following discussion, the states of the ph signal 271 and the nph signal 273 output from the timing detector 266 are discussed along with the conditions under which they change. This is illustrated in terms of a state diagram in FIG. 11 rather than, for example, gates. This is done to provide a clearer understanding of the present invention. It will be obvious to one skilled in the art that ordinary logic may be used to implement the state diagram.

The timing circuit 266 starts in state 00 with an output equal to 0, when the zero signal 265 and the interval signal 67 are both equal to "0". In the next state, the relevant time interval is entered and the state stays the same as long as the interval signal 267 is equal to "1" and the zero signal is equal to "0". If the interval signal 267 becomes equal to "0" and the zero signal 265 becomes equal to "1", then the power-cross state occurs and the ph signal output 271 becomes equal to "1". If interval signal 267 becomes "0" and the zero signal 265 becomes "0", then a power-cross has not been detected and the nph signal 273 becomes "1", thereby resetting the latches 262 and 263.

Figure 12A:
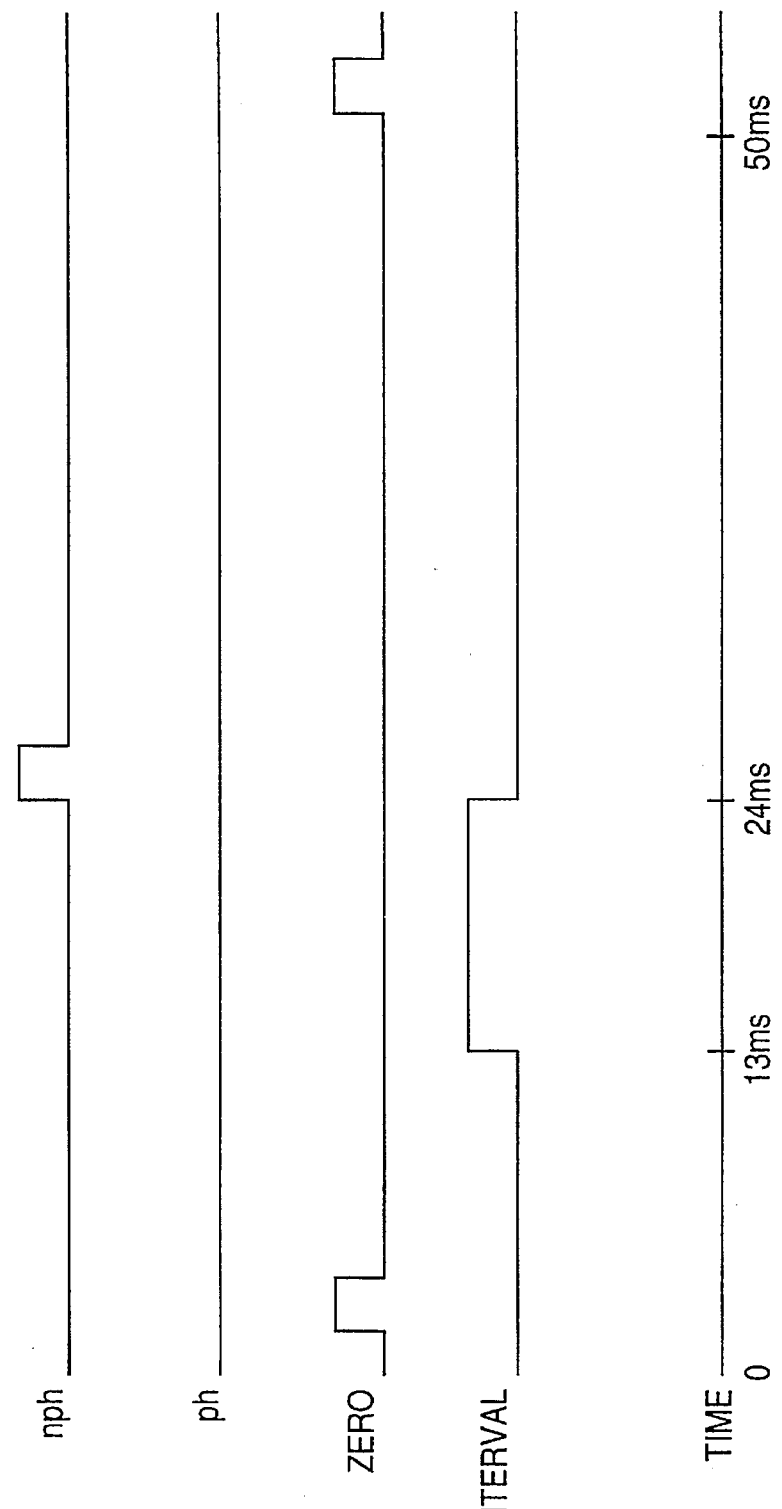
FIGS. 12A and 12B show the timing diagrams illustrating the function of the power-cross detection circuit according to the second embodiment of the instant invention.
Figure 12B:
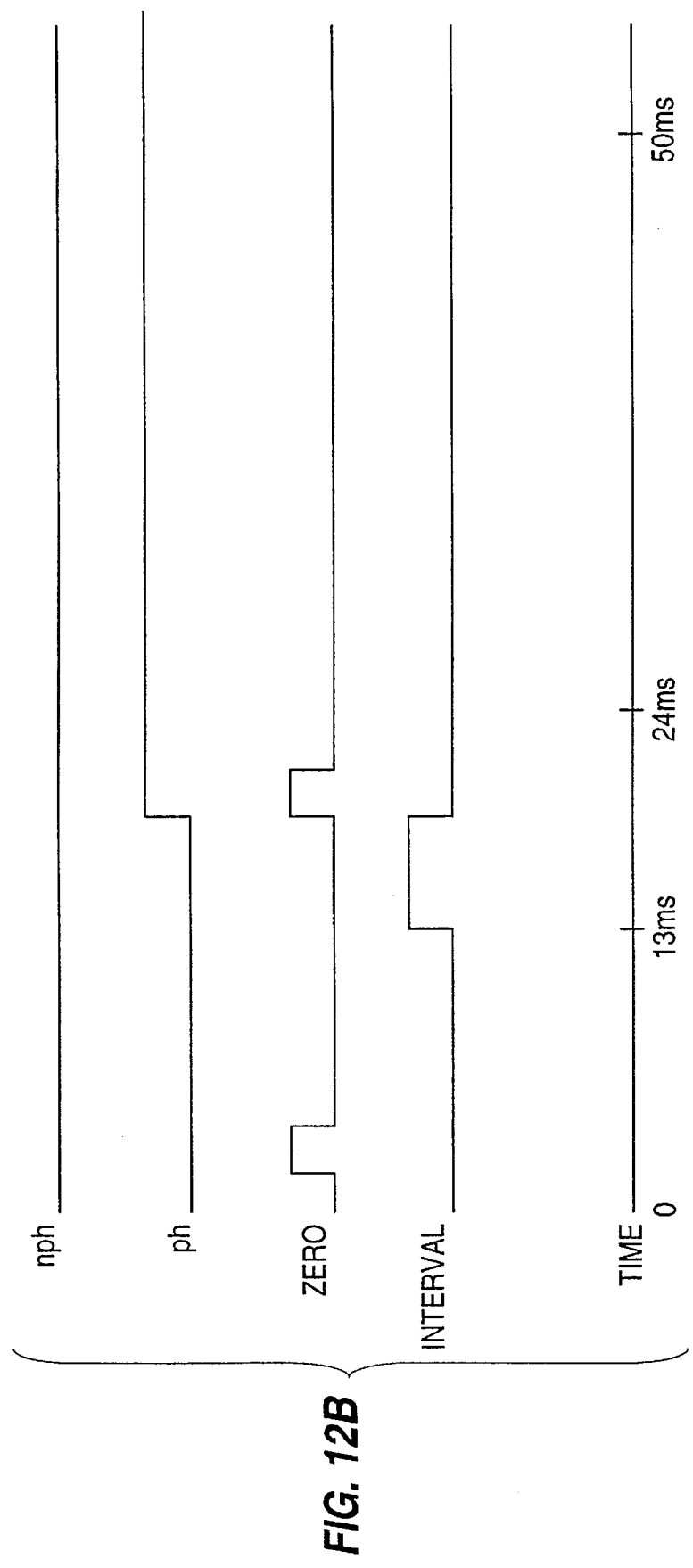

Referring now to FIGS. 12A and 12B, FIG. 12A shows the timing diagram of the outputs of decoder 268 and timing detector 266 when power-crossing has not been detected whereas FIG. 12B shows the timing diagram when power-crossing has been detected. As shown in FIG. 12A, a ph signal 271, which is output from the timing detector 266, stays at a low level. The nph signal 273 from the timing detector 266 resets latches 262 and 263 at the end of the 24 milliseconds time period. As shown in FIG. 12A, no zero crossings were detected between the 14 milliseconds to the 24 milliseconds time period.

Referring now to FIG. 12B, the counter is reset when a zero crossing is detected within the relevant time period, i.e., between 14 milliseconds and 24 milliseconds; the nph signal 273 remains low and thus, latches 262 and 263 are not reset. However, the ph signal 271 becomes active and enables the third input of NAND gate 264, thereby achieving power-cross detection.

In summary, a circuit which detects the presence of a foreign potential on the telephone line during the ringing of the telephone is disclosed. The characteristic signature of a power-cross waveform is identified which is different from noise, relay bouncing, or a high voltage ringer. The power-cross circuit detects the high voltage signature of a 60 Hz signal waveform superimposed to a 20 Hz signal waveform of the ringer. When a power-cross alternating current voltage is present, various current zero crossings occur in the telephone line. The zero crossings are monitored in a pre-determined time interval and for two consecutive cycles to detect the presence of the power-cross signal.

While the foregoing description and drawings represent the preferred embodiments of the invention, it will be obvious to those skilled in the art that various changes and modifications may be made therein without departing from the true spirit and scope of the present invention.

What is claimed is:

1. A power-cross detection circuit, comprising:

comparator means for detecting a voltage level of an input signal;

zero crossing detection means, connected to said comparator means, for detecting a plurality of zero crossings of current of said input signal, said comparator outputting a first signal when said voltage level exceeds a predetermined voltage level anytime in a first cycle which is between a first and a second one of said plurality of zero crossings and anytime in a second cycle which is between the second and a third one of said plurality of zero crossings, said zero crossing detection means outputting a second signal upon detection of said plurality of zero crossings; and logic means, connected to said comparator means and said zero crossing detection means, for outputting a third signal when a time interval between the first one of said plurality of zero crossings and the second one of said plurality of zero crossings is between a first time and a second time and when the time interval between the second one of said plurality of zero crossings and the third one of said plurality of zero crossings is between the first time and the second time, a power-cross condition being detected based on said first, second and third signals.

2. A power-cross detection circuit as defined in claim 1 wherein said plurality of zero crossings includes a first zero crossing of said current from a first half-cycle having a first polarity to a second half-cycle having a second polarity, a second zero crossing of said current from a third half-cycle having said first polarity to a fourth half-cycle having said second polarity, and a third zero crossing of said current from a fifth half-cycle having said first polarity to a sixth half-cycle having said second polarity.

3. A power-cross detection circuit as defined in claim 1 wherein said first time is equal to 14 milliseconds and said second time is equal to 24 milliseconds.

4. A power-cross detection circuit as defined in claim 1 wherein said predetermined voltage level is equal to about 50 volts.

5. A power-cross detection circuit as defined in claim 2 wherein said first polarity is positive and said second polarity is negative.

6. A power-cross detection circuit as defined in claim 2 wherein said first polarity is negative and said second polarity is positive.

7. A power-cross detection circuit as defined in claim 2 wherein said second signal is determined by said first, second and third zero crossings.

8. A power-cross detection circuit as defined in claim 7 wherein said first time is equal to 14 milliseconds and said second time is equal to 24 milliseconds.

9. A power-cross detection circuit, comprising:

comparator means for detecting a voltage level of an input signal;

zero crossing detection means, connected to said comparator means, for detecting zero crossings of current of said input signal, said zero crossings including a first zero crossing of said current from a first positive half-cycle to a first negative half-cycle, a second zero crossing of said current from a second positive half-cycle to a second negative half-cycle, and a third zero crossing of said current from a third positive half-cycle to a third negative half-cycle, said comparator means outputting a first signal when said voltage level exceeds a predetermined voltage level during a first period between the first and second one of said plurality of zero crossings and during a second period between the second and third one of said plurality of zero crossings, said zero crossing detection means outputting a second signal upon detection of said first, second and third zero crossings; and logic means, connected to said comparator means and said zero crossing detection means, for outputting a third signal when a time interval between said first zero crossing and said second zero crossing and between said second zero crossing and said third zero crossing is between 14 milliseconds and 24 milliseconds, a power-cross condition being detected based on said first, second and third signals.

10. An apparatus for detecting a foreign potential on telephone lines connected to a telephone and a subscriber line interface circuit (SLIC) through tip and ring terminals, a protecting device connected across the tip and ring terminals through first and second relays said apparatus comprising:

a power-cross detection circuit for measuring a loop current passing through the telephone by sensing current through a ring feed resistor connected to said second relay and said ring terminal, said loop current being measured to determine a plurality of zero crossings of said loop current, said power-cross detection circuit sensing a voltage across said ring feed resistor and comparing said voltage to a predetermined threshold voltage, and when said voltage is greater than the threshold voltage, said power-cross detection circuit determining whether a predetermined number of zero crossings of the loop current have occurred during a predetermined time interval wherein the power-cross detection circuit determines the zero crossings by first detecting a first high-to-low zero crossing, next, detecting a second high-to-low zero crossing, and subsequently detecting a third high-to-low zero crossing.

11. An apparatus for detecting a foreign potential on telephone lines connected to a telephone and a subscriber line interface circuit (SLIC) through tip and ring terminals, a protecting device connected across the tip and ring terminals through first and second relays, said apparatus comprising:

a power-cross detection circuit for measuring a loop current passing through the telephone by sensing current through a ring feed resistor connected to said second relay and said ring terminal, said loop current being measured to determine a plurality of zero crossings of said loop current, said power-cross detection circuit sensing a voltage across said ring feed resistor and comparing said voltage to a predetermined threshold voltage, and when said voltage is greater than the threshold voltage, said power-cross detection circuit determining whether a predetermined number of zero crossings of the loop current have occurred during a predetermined time interval wherein the power-cross detection circuit determines the zero crossings by first detecting a first low-to-high zero crossing, next, detecting a second low-to-high zero crossing, and subsequently detecting a third low-to-high zero crossing.

12. An apparatus for detecting a foreign potential on telephone lines connected to a telephone and a subscriber line interface circuit (SLIC) through tip and ring terminals, a protecting device connected across the tip and ring terminals through first and second relays, said apparatus comprising:

a power-cross detection circuit for measuring a loop current passing through the telephone by sensing current through a ring feed resistor connected to said second relay and said ring terminal, said loop current being measured to determine a plurality of zero crossings of said loop current, said power-cross detection circuit sensing a voltage across said ring feed resistor and comparing said voltage to a predetermined threshold voltage, and when said voltage is greater than the threshold voltage, said power-cross detection circuit determining whether a predetermined number of zero crossings of the loop current have occurred during a predetermined time interval wherein said power-cross detection circuit further comprises:

a plurality of latches for inputting an input signal;

a logic gate connected to said latches for outputting a foreign potential detect signal; and a timing detector, connected to said logic gate and said latches, for determining whether the predetermined number of zero crossings of the loop current have occurred during the predetermined time interval.

13. A power-cross detection method, comprising the steps of:

a) detecting a voltage level of an input signal;

b) detecting, a first zero crossing of said current from a first positive half-cycle to a first negative half-cycle;

c) detecting a second zero crossing of said current from a second positive half-cycle to a second negative half-cycle;

d) detecting a third zero crossing of said current from a third positive half-cycle to a third negative half-cycle;

e) outputting a first signal when said voltage level exceeds a predetermined voltage level anytime in a time period between said first zero crossing and said second zero crossing and anytime in a time period between said second zero crossing and said third zero crossing;

f) outputting a second signal upon detection of said first, second and third zero crossings;

g) outputting a third signal when a time interval between said first zero crossing and said second zero crossing and between said second zero crossing and said third zero crossing is between 14 milliseconds and 24 milliseconds; and h) outputting a power-cross detected signal based on said first, second and third signals.

14. A power-cross detection circuit, comprising:

comparator means for detecting a voltage level of an input signal and outputting a first signal when said voltage level exceeds a predetermined voltage level;

zero crossing detection means, connected to said comparator means, for detecting zero crossings of current of said input signal, said zero crossings including a first zero crossing of said current from a first positive half-cycle to a first negative half-cycle, a second zero crossing of said current from said first negative half-cycle to a second positive half-cycle, and a third zero crossing of said current from said second positive half-cycle to a second negative half-cycle, said zero crossing detection means outputting a second signal upon detection of said first, second and third zero crossings; and logic means, connected to said comparator means and said zero crossing detection means, for outputting a third signal when a time interval between said first zero crossing and said third zero crossing is between 14 milliseconds and 24 milliseconds, a power-cross condition being detected based on said first, second and third signals.

15. An apparatus for detecting a foreign potential on telephone lines connected to a telephone and a subscriber line interface circuit (SLIC) through tip and ring terminals, a protecting device connected across the tip and ring terminals through first and second relays, said apparatus comprising:

a power-cross detection circuit for measuring a loop current passing through the telephone by sensing current through a ring feed resistor connected to said second relay and said ring terminal, said loop current being measured to determine a plurality of zero crossings of said loop current, said power-cross detection circuit sensing a voltage across said ring feed resistor and comparing said voltage to a predetermined threshold voltage, and when said voltage is greater than the threshold voltage, said power-cross detection circuit determining whether a predetermined number of zero crossings of the loop current have occurred during a predetermined time interval wherein the power-cross detection circuit determines the zero crossings by first detecting a high-to-low zero crossing, next, detecting a low-to-high zero crossing, and subsequently detecting a high-to-low zero crossing.

16. An apparatus for detecting a foreign potential on telephone lines connected to a telephone and a subscriber line interface circuit (SLIC) through tip and ring terminals, a protecting device connected across the tip and ring terminals through first and second relays, said apparatus comprising:

a power-cross detection circuit for measuring a loop current passing through the telephone by sensing current through a ring feed resistor connected to said second relay and said ring terminal, said loop current being measured to determine a plurality of zero crossings of said loop current, said power-cross detection circuit sensing a voltage across said ring feed resistor and comparing said voltage to a predetermined threshold voltage, and when said voltage is greater than the threshold voltage, said power-cross detection circuit determining whether a predetermined number of zero crossings of the loop current have occurred during a predetermined time interval wherein the power-cross detection circuit determines the zero crossings by first detecting a low-to-high zero crossing, next, detecting a high-to-low zero crossing, and subsequently detecting a low-to-high zero crossing.

17. An apparatus for detecting a foreign potential on telephone lines connected to a telephone and a subscriber line interface circuit (SLIC) through tip and ring terminals, a protecting device connected across the tip and ring terminals through first and second relays, said apparatus comprising:

a power-cross detection circuit for measuring a loop current passing through the telephone by sensing current through a ring feed resistor connected to said second relay and said ring terminal, said loop current being measured to determine a plurality of zero crossings of said loop current, said power-cross detection circuit sensing a voltage across said ring feed resistor and comparing said voltage to a predetermined threshold voltage, and when said voltage is greater than the threshold voltage, said power-cross detection circuit determining whether a predetermined number of zero crossings of the loop current have occurred during a predetermined time interval wherein said power-cross detection circuit further comprises:

a plurality of latches for inputting an input signal;

a logic gate connected to said latches for outputting a foreign potential detect signal;

a timing detector, connected to said logic gate, for determining whether the predetermined number of zero crossings of the loop current have occurred during the predetermined time interval;

a decoder circuit connected to said timing detector; and a counter connected to said decoder circuit and said latches for determining the predetermined time interval, said latches include first and second latches for delaying an activation of said timing detector, a third latch for storing the input signal, and a fourth latch for storing one of said zero crossings.

18. A power-cross detection circuit, comprising:

comparator means for detecting a voltage level of an input signal and outputting a first signal when said voltage level exceeds a predetermined voltage level;

zero crossing detection means, connected to said comparator means, for detecting a plurality of zero crossings of current of said input signal, said zero crossing detection means outputting a second signal upon detection of said plurality of zero crossings; and logic means, connected to said comparator means and said zero crossing detection means, for outputting a third signal when a time interval between one of said plurality of zero crossings and another one of said plurality of zero crossings is between a first time and a second time, a power-cross condition being detected based on said first, second and third signals.

19. A power-cross detection circuit as defined in claim 18 wherein said plurality of zero crossings includes a first zero crossing of said current from a first half-cycle having a first polarity to a second half-cycle having a second polarity, a second zero crossing of said current from said second half-cycle to third half-cycle having said first polarity, and a third zero crossing of said current from said third half-cycle to a fourth half-cycle having said second polarity.

20. A power-cross detection circuit as defined in claim 18 wherein said first time is equal to 14 milliseconds and said second time is equal to 24 milliseconds.

21. A power-cross detection circuit as defined in claim 18 wherein said predetermined voltage level is equal to about 50 volts.

22. A power-cross detection circuit as defined in claim 19 wherein said first polarity is positive and said second polarity is negative.

23. A power-cross detection circuit as defined in claim 19 wherein said first polarity is negative and said second polarity is positive.

24. A power-cross detection circuit as defined in claim 19 wherein said second signal is determined by said first, second and third zero crossings.

25. A power-cross detection circuit as defined in claim 24 wherein said first time is equal to 14 milliseconds and said second time is equal to 24 milliseconds.

26. A power-cross detection method, comprising the steps of:

a) detecting a voltage level of an input signal and outputting a first signal when said voltage level exceeds a predetermined voltage level;

b) detecting, a first zero crossing of said current from a first positive half-cycle to a first negative half-cycle;

c) detecting a second zero crossing of said current from said first negative half-cycle to a second positive half-cycle;

d) detecting a third zero crossing of said current from said second positive half-cycle to a second negative half-cycle;

e) outputting a second signal upon detection of said first, second and third zero crossings;

f) outputting a third signal when a time interval between said first zero crossing and said third zero crossing is between 14 milliseconds and 24 milliseconds; and g) outputting a power-cross detected signal based on said first, second and third signals.

* * * * *